United States Patent
Kim et al.

(10) Patent No.: US 7,361,431 B2
(45) Date of Patent: Apr. 22, 2008

(54) CATHODE ELECTRODE INCLUDING A POROUS CONDUCTIVE MATERIAL COATED AND/OR FILLED WITH SULFUR AND/OR A SULFUR-CONTAINING ORGANIC COMPOUND AND LITHIUM BATTERY CONTAINING THE SAME

(75) Inventors: Min-seuk Kim, Seoul (KR); Duck-young Yoo, Suwon (KR); Jae-young Choi, Suwon (KR); Jong-ki Lee, Seoul (KR)

(73) Assignee: Samsung SDI Co., Ltd., Suwon, Kyungki-do (KR)

( * ) Notice: Subject to any disclaimer, the term of this patent is extended or adjusted under 35 U.S.C. 154(b) by 324 days.

(21) Appl. No.: 10/173,976

(22) Filed: Jun. 19, 2002

(65) Prior Publication Data

US 2003/0113624 A1    Jun. 19, 2003

(30) Foreign Application Priority Data

Dec. 19, 2001  (KR)  ............................ 2001-81130
May 14, 2002  (KR)  ............................ 2002-26520

(51) Int. Cl.
*H01M 4/60* (2006.01)
*H01M 4/58* (2006.01)

(52) U.S. Cl. ................... 429/213; 429/218.1

(58) Field of Classification Search ............. 429/212, 429/213, 218.1
See application file for complete search history.

(56) References Cited

U.S. PATENT DOCUMENTS

| | | | |
|---|---|---|---|
| 3,925,098 A | 12/1975 | Saunders et al. | |
| 4,143,217 A | 3/1979 | Joo' et al. | |
| 5,300,371 A * | 4/1994 | Tomantschger et al. | 429/60 |
| 5,501,915 A * | 3/1996 | Hards et al. | 429/42 |
| 5,523,179 A | 6/1996 | Chu | |
| 5,582,623 A | 12/1996 | Chu | |
| 5,643,670 A * | 7/1997 | Chung | 428/367 |
| 6,030,720 A | 2/2000 | Chu et al. | |
| 6,110,619 A | 8/2000 | Zhang et al. | |
| 6,210,831 B1 | 4/2001 | Gorkovenko et al. | |
| 6,358,643 B1 * | 3/2002 | Katz et al. | 429/105 |
| 6,403,255 B1 * | 6/2002 | Gofer et al. | 429/213 |
| 2002/0009639 A1 | 1/2002 | Miyake et al. | |
| 2003/0108785 A1* | 6/2003 | Wu et al. | 429/44 |
| 2003/0161781 A1* | 8/2003 | Cabasso et al. | 423/445 R |

FOREIGN PATENT DOCUMENTS

| | | |
|---|---|---|
| JP | 63-062164 | 3/1988 |
| JP | 63-62164 * | 3/1988 |
| JP | 09-147868 | 6/1997 |

(Continued)

*Primary Examiner*—Patrick Joseph Ryan
*Assistant Examiner*—Thomas H. Parsons
(74) *Attorney, Agent, or Firm*—Lee & Morse, P.C.

(57) ABSTRACT

Disclosed is a cathode electrode having a cathode active material layer stacked on a current collector. The cathode active material layer includes a porous conductive material having a surface coated with sulfur and/or a sulfur-containing organic compound and/or pores filled with sulfur and/or a sulfur-containing organic compound. A lithium secondary battery employing the cathode electrode also is disclosed. The cathode electrode is structurally stable during charging and discharging since the structure of the cathode active material layer can be maintained even at the phase transition of sulfur during charging and discharging.

16 Claims, 7 Drawing Sheets

FOREIGN PATENT DOCUMENTS

| | | | |
|---|---|---|---|
| JP | 10-275615 | * | 10/1998 |
| JP | 2001-520447 | | 10/2001 |
| JP | 2001-307727 | | 11/2001 |
| JP | 2001-527275 | | 12/2001 |
| JP | 2001-527276 | | 12/2001 |
| WO | WO 99/33132 | | 7/1999 |
| WO | WO 99/57770 | | 11/1999 |
| WO | WO 01/57943 | | 8/2001 |

* cited by examiner

CATHODE ELECTRODE INCLUDING A POROUS CONDUCTIVE MATERIAL COATED AND/OR FILLED WITH SULFUR AND/OR A SULFUR-CONTAINING ORGANIC COMPOUND AND LITHIUM BATTERY CONTAINING THE SAME

BACKGROUND OF THE INVENTION

1. Field of the Invention

The present invention relates to a cathode electrode, a method for manufacturing the same, and to a lithium battery containing the same. More particularly, the present invention relates to a cathode electrode that maintains its structure when sulfur contained in a cathode active material is dissolved in an electrolytic solution during discharge, to a method for manufacturing the same, and to a lithium battery containing the same.

2. Description of the Related Art

Theoretically, a sulfur monomer has a very high electrochemical capacity of 1680 mAh/g and has voltage plateau region of approximately 2 V with respect to lithium metal. A cathode electrode using sulfur has a higher capacity than a conventional cathode for a lithium secondary battery. Thus, intensive research into cathode electrodes using sulfur is being carried out to be used for next generation secondary batteries.

It is known that sulfur cathode active materials undergo various electrochemical reactions as follows. However, the reaction capacity of sulfur that can be actually used for a lithium secondary battery is only a half a theoretical capacity, that is, approximately 840 mAh/g, due to irreversibility of some polysulfides.

$2Li+S_8$ (solid)$\leftrightarrows Li_2S_8$ (solution)
$2Li+Li_2S_8$ (solution)$\leftrightarrows 2Li_2S_4$ (solution)
$2Li+Li_2S_4$ (solution)$\leftrightarrows 2Li_2S_2$ (solution)
$2Li+Li_2S_2$ (solution)$\leftrightarrows 2Li_2S_8$ (solid precipitate)

Sulfur and sulfur-containing organic compounds, which are cathode active materials, have no or very low electrical conductivity. Thus, in order to cause an electrochemical reaction, it is necessary for the cathode active material to contact the surface of a conductive reaction site. Also, in order to smoothly provide electrochemical reaction sites, it is necessary to establish a sufficient reaction surface area for reaction through the use of large amounts of conductive materials. In particular, the use of sulfur monomers as a cathode active material cause phase transition from solid sulfur monomer ($S_8$) to polysulfides as a discharge product $Li_2S_X$ expected to be dissolved in electrolytic solution during an initial discharge stage.

Known cathode electrodes using sulfur are disclosed in U.S. Pat. Nos. 5,523,179 and 5,582,623, in which sulfur as an active material and carbon powder as a conductive material are simply mixed, occupying separate spaces in a cathode active material layer, so that the space occupied by solid sulfur is collapsed due to dissolution of sulfur in electrolytic solution during phase transition from sulfur to polysulfide at charging and discharging stages. This adversely affects battery characteristics, especially charge and discharge performance and life characteristic of a lithium battery.

SUMMARY OF THE INVENTION

Accordingly, one feature of an embodiment of the present invention is to provide a cathode electrode having a new cathode active material layer that does not undergo structural change that may adversely affect charge and discharge performance. This embodiment utilizes a porous conductive material, the pores of which are filled with sulfur and/or the surface of which is coated with sulfur, so that the structure of the cathode active material layer is maintained even at phase transition of sulfur during charging and discharging. Thus, the cathode electrode according to the present invention is distinguishable from a conventional cathode electrode using sulfur as a cathode active material, which causes phase transition during charging and discharging, leading to structural change because sulfur, a conductive material and a binder occupy separate spaces in the cathode active material layer.

Another feature of an embodiment of the present invention relates to a method for manufacturing the cathode electrode having a new cathode electrode material layer using a porous conductive material filled with sulfur, and/or coated with sulfur.

Another feature of an embodiment of the present invention relates to a lithium battery using the cathode electrode.

In one embodiment of the present invention, there is provided a cathode electrode having a cathode active material layer stacked on a current collector, wherein the cathode active material layer includes a porous conductive material selected from: (i) a porous conductive material whose surface is coated with sulfur and/or a sulfur-containing organic compound; (ii) a porous conductive material whose pores are filled with sulfur and/or a sulfur-containing organic compound; and (iii) a porous conductive material whose surface is coated with sulfur and/or whose pores are filled with sulfur and/or a sulfur-containing organic compound.

Preferably, the porous conductive material is electrochemically connected to the current collector, and to another porous conductive material.

In addition, the porous conductive material preferably is porous carbon powder and/or metal powder having a specific surface area of greater than or equal to 300 m²/g, and having pores whose average diameter is within the range of from about 0.05 nm to about 1 μm, more preferably about 0.5 nm to about 1 μm. If the specific surface area of the porous conductive material is less than 300 m²/g, the shortage may give rise to poor porosity. Although any porous conductive material having a specific surface area of greater than or equal to 300 m²/g can be used, the maximum specific surface area of porous conductive materials currently commercially available in the market is 4000 m²/g. Thus, it can be said that for currently available commercial materials, the maximum specific surface area of usable porous conductive materials in the present invention is 4000 m²/g. To the extent porous conductive materials are later developed having specific surface areas above 4000 m²/g, these materials also would be useful in the present invention. If the pore size is less than 0.5 nm, sulfur may be coated mainly on the surface of the porous conductive material. If the pore size is greater than 1 μm, sulfur may be filled mainly into pores.

The thickness of the cathode active material layer preferably is from about 2 to about 500 μm and more preferably about 2 to about 200 μm.

Also, the porous conductive material preferably is bound to the current collector and another porous conductive material by at least one binder selected from the group consisting of polyethylene oxide, polyvinylidene fluoride, a copolymer of vinylidene fluoride and hexafluoropropylene, and a mixture of polyvinylidene fluoride and styrene-butadiene rubber.

The amount of the porous conductive material preferably is from about 70 to about 98% by weight based on the weight of the cathode active material layer.

The average particle size of the porous conductive material is preferably in a range of from about 10 nm to about 20 μm, more preferably from about 0.5 μm to about 20 μm. A porous conductive material having an average particle size of from about 10 nm to about 0.5 μm can be suitably used for coating sulfur on the surface thereof, and a porous conductive material having an average particle size of from about 0.5 μm to about 20 μm can be suitably used for filling sulfur into pores thereof.

In accordance with another embodiment of the present invention, there is provided a secondary battery comprising the cathode electrode described above. As used herein, the secondary battery encompasses lithium secondary batteries such as lithium ion batteries or lithium ion polymer batteries, not to be considered limiting.

An additional embodiment of the present invention encompasses a method for manufacturing a cathode electrode including placing sulfur and/or a sulfur-containing organic compound and a dried porous conductive substrate in a sealed container in an unmixed state, and allowing the sulfur and/or the sulfur-containing organic compound and the dried porous conductive substrate to stand at a temperature in the range of from about 50 to 300° C. under a pressure in the range of from about $10^{-6}$ to 760 Torr for about 2 to 72 hours, so that the sulfur and/or the sulfur-containing organic compound is vaporized to then diffuse into pores of the dried porous conductive substrate, followed by coating the surface of and/or filling the pores of the porous conductive substrate, thereby producing a porous conductive material the surface of which is coated with and/or pores of which are filled with sulfur and/or a sulfur-containing organic compound.

If the processing temperature is lower than 50° C., evaporation of sulfur and/or the sulfur-containing organic compound may be difficult to achieve. If the processing temperature is higher than 300° C., the manufacturing process may become inefficient. If the pressure is less than $10^{-6}$ Torr, an expensive evaporation facility may be additionally necessary. If the pressure is greater than 760 Torr, that is, greater than atmospheric pressure, a separate compression facility may be necessary.

In accordance with another embodiment of the present invention, there is provided a method for manufacturing a cathode electrode including (a) mixing a dried porous conductive substrate and sulfur and/or a sulfur-containing organic compound in a sealed container and heating the mixture at a temperature in the range of from about 50 to 300° C. to melt the sulfur and/or the sulfur-containing organic compound in the mixture, followed by coating the surface of and/or filling the pores of the porous conductive substrate with the molten sulfur and/or the sulfur-containing compound, and (b) reducing the pressure of the sealed container to be within the range of from about $10^{-6}$ to 760 Torr to remove the gas present in the pores. The reduced pressure also allows the sulfur contained in the sealed container to continuously fills the pores, and to further fill the pores with the molten sulfur and/or the sulfur-containing compound, thereby producing a porous conductive material whose surface is coated with and/or whose pores are filled with sulfur and/or a sulfur-containing organic compound.

After procedure (b), the method may further including (c) forcibly injecting the molten sulfur and/or the sulfur-containing organic compound into the pores while increasing the pressure of the sealed container to be within the range of from about 760 to 7,000 Torr.

If the pressure is less than about 760 Torr, the compression effect may not be exhibited. If the pressure is greater than 7,000 Torr, the amount of sulfur filled may not substantially increase even under higher pressures, resulting in an increase in cost required for supplying higher pressures. In order to increase the amount of sulfur and/or the sulfur-containing organic compound filled, (b) and (c) may be repeated 2 to 10 times.

In accordance with the above-described features and embodiments of the present invention, the method may further include preparing a cathode active material slurry by homogenously mixing from about 70 to 98% by weight of the sulfur filled and/or coated porous conductive material, and about 2 to 30% by weight of a binder in about 40 to 200% by weight of a solvent based on total weight of the solids, and then coating a current collector with the cathode active material slurry. If the amount of the solvent is less than about 40% by weight based on total weight of the solids, the viscosity may be overly high, making coating difficult, and if greater than about 200% by weight, the viscosity may be too low to perform coating properly.

In the method for manufacturing the cathode electrode, the porous conductive material preferably is porous carbon powder and/or metal powder having a specific surface area of greater than or equal to 300 $m^2/g$ and having pores whose average diameter is within the range of from about 0.05 nm to 1 μm, more preferably about 0.5 nm to 1 μm.

The binder preferably is at least one selected from the group consisting of polyethylene oxide, polyvinylidene fluoride, a copolymer of vinylidene fluoride and hexafluoropropylene, and a mixture of polyvinylidene fluoride and styrene-butadiene rubber.

Prior to preparation of the cathode active material slurry, the method may further include pulverizing the porous conductive material coated and/or filled with the sulfur and/or the sulfur-containing organic compound to adjust the average particle size to be within the range of from about 10 nm to 20 μm. In order to fill as much active material as possible into the pores of the porous conductive material, the porous conductive material preferably is pulverized to have an average particle size within the range of from about 0.5 to 20 μm.

Alternatively, an embodiment of the present invention also provides a porous conductive material for use in a cathode active material for a secondary battery, wherein the surface of the porous conductive material is coated with sulfur and/or a sulfur-containing organic compound, and/or pores of the porous conductive material are filled with sulfur and/or a sulfur-containing organic compound.

The porous conductive material preferably is porous and/or metal powder having a specific surface area of greater than or equal to 300 $m^2/g$ and having pores whose average diameter is within the range of from about 0.05 nm to 1 μm, more preferably from about 0.5 nm to 1 μm for the purpose of filling as much active material as possible into the pores of the porous conductive material.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF PREFERRED EMBODIMENTS

Priority applications, Korean Patent Application No. 2001-81130 filed Dec. 19, 2001, and Korean Patent Application No. 2002-26520 filed May 14, 2002, are incorporated by reference herein in their entirety.

A conductive material, a cathode electrode prepared using the conductive material and a manufacturing method therefor according to the present invention will be described. As used throughout the specification, it is to be understood that the term "sulfur" includes sulfur-containing organic compounds as well as sulfur itself. In some cases, it will be convenient to describe that pores of a porous conductive material are filled with sulfur, although it is to be understood that this term also includes sulfur used to coat the surface of a conductive material.

Figure 1:
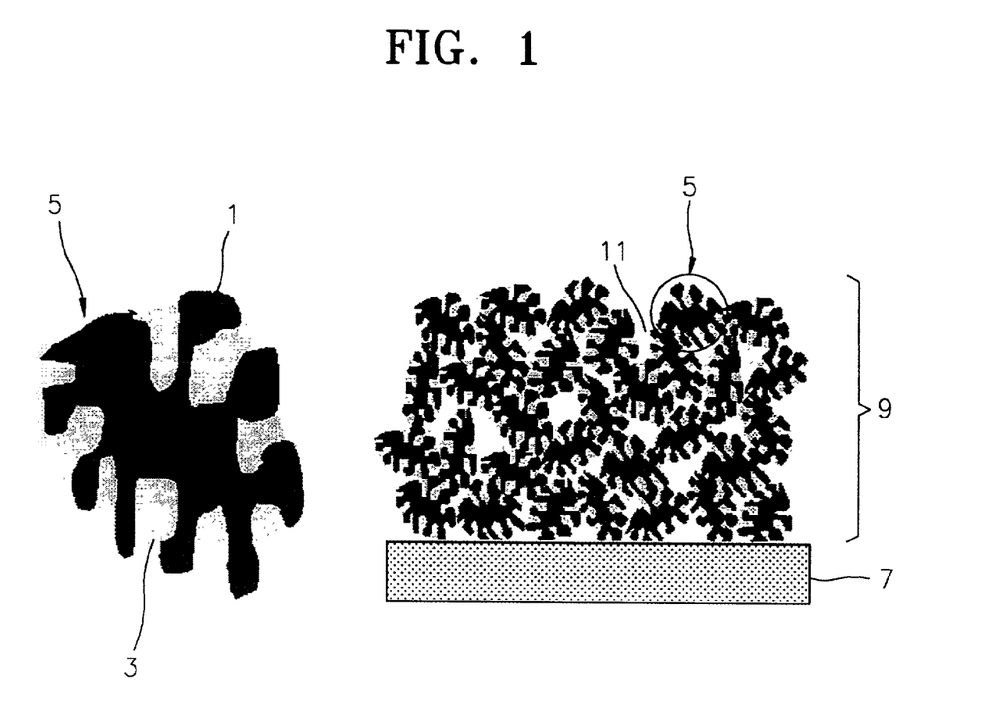
FIG. 1 is a diagram of a porous conductive material filled with sulfur and a cathode electrode containing the porous conductive material in a cathode active material layer.

FIG. 1 is a diagram of a porous conductive material filled with sulfur and a cathode electrode containing the porous conductive material in a cathode active material layer. Referring to FIG. 1, a porous conductive material 5 includes a porous conductive substrate 1 having pores to be filled with sulfur 3. The porous conductive material 5 is constructed such that the porous conductive substrate 1, such as carbon powder and/or metal powder having a specific surface area of 300 $m^2/g$ and an average pore diameter of approximately 0.05 nm to approximately 1 μm, has pores filled with sulfur 3. The porous conductive material 5 filled with sulfur is very large in specific surface area, providing sufficient activation sites where electrochemical oxidation/reduction of sulfur occur, thereby effectively reducing an activation overpotential during the oxidation/reduction of sulfur.

Also, the porous conductive material filled with sulfur used in the present invention preferably has a particle size within the range of approximately 10 nm to 20 μm, by which contact resistance between porous conductive particles can be reduced and the active material content within an active material layer can be increased. Such a porous conductive material provides a secondary battery with high capacity. If the particle size of the porous conductive material is less than 10 nm, a sufficient effect of reducing the activation overpotential may not be achieved. If the particle size of the porous conductive material is greater than about 20 μm, it may be difficult to manufacture an electrode having uniform physical properties. Thus, it is relatively important, although not necessary to adjust the particle size to be within the above range.

Referring back to FIG. 1, a cathode electrode is constructed such that a cathode active material layer 9 containing the porous conductive material 5 filled with sulfur is stacked on a current collector 7.

A particle of the porous conductive material 5 preferably is electrochemically connected with other particles of the porous conductive material 5 and the current collector 7. Also, the porous conductive material 5 preferably is bound to the current collector 7 by means of a binder 11. Usable examples of the binder 11 include polyethylene oxide, polyvinylidene fluoride, a copolymer of vinylidene fluoride and hexafluoropropylene, or a mixture of polyvinylidene fluoride and styrene-butadiene rubber.

The thickness of the active material layer 9 as dried can be adjusted to be in the range of approximately 2 to 200 μm, if necessary. If the thickness of the active material layer 9 is less than 2 μm, the shortage may entail difficulty in the manufacture of the active material layer, because the active material layer may be too small compared to the overall size of the conductive material. If the thickness of the active material layer 9 is greater than 200 μm, the excess may give rise to the disadvantage that the thickness of a layer coated with slurry becomes overly thick, making the layer non-uniform in thickness distribution.

The porous conductive material 5 filled with sulfur preferably is present in layer 9 within the range of approximately 70 to 98% by weight, based on the weight of the cathode active material layer 9. If the porous conductive material 5 filled with sulfur is less than 70%, the capacity per unit volume of a battery may be undesirably reduced, and if greater than 98%, particles of the conductive material 5 may not be firmly bound to one another.

Figure 2:
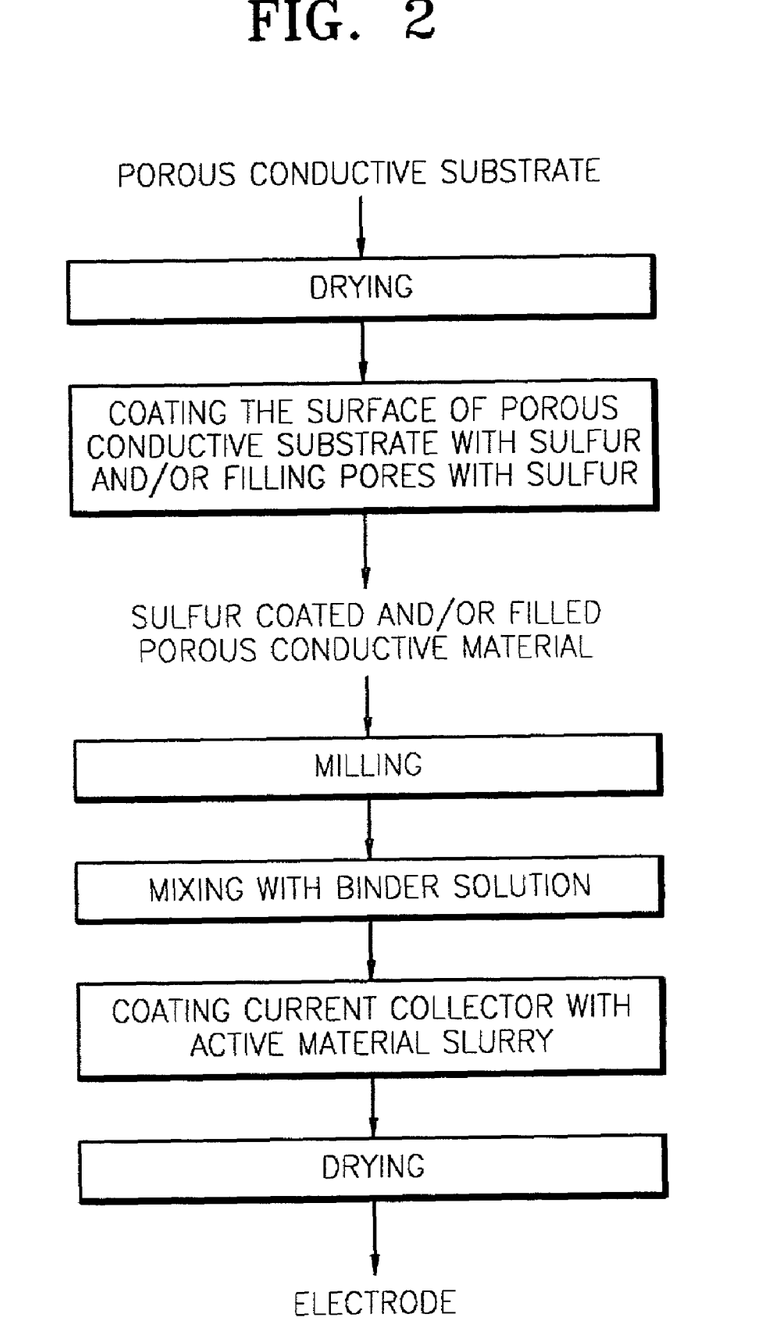
FIG. 2 is a flowchart illustrating the steps of a method for manufacturing a cathode electrode according to the present invention.

A method for manufacturing a cathode electrode according to the present invention, and a lithium secondary battery employing the same now will be described. FIG. 2 represents a flowchart illustrating the steps of a preferred method for manufacturing a cathode electrode according to the present invention. Referring to FIG. 2, moisture adsorbed into a porous conductive substrate can be removed by drying a porous conductive substrate having a specific surface area of greater than or equal to 300 $m^2/g$ and having a pore size within the range of from about 0.05 nm to 1 μm. It is particularly preferred that the porous conductive substrate is carbon powder and/or metal powder, and that it is dried at a temperature within the range of from about 100 to 150° C. under atmospheric pressure or reduced pressure. This process is performed for the purpose of promoting filling pores with sulfur in a subsequent procedures. Subsequently, pores of the dried porous conductive substrate are filled with sulfur, which is performed by at least one of two ways.

In one embodiment, vapor sulfur is adsorbed into the pores using an adsorptive force of the porous conductive substrate, which starts with placing sulfur and the dried porous conductive substrate in a sealed container, but not in a mixed state. The sulfur and the dried porous conductive substrate then are allowed to stand at a temperature within the range of from approximately 50 to 300° C. under a pressure within the range of from approximately $10^{-6}$ to 760 Torr for about 2 to 72 hours, so that the vaporized sulfur is diffused into the pores of the dried porous conductive substrate. The pores thus are filled, thereby manufacturing the porous conductive material filled with sulfur.

In a second embodiment, molten sulfur may be adsorbed into the pores of the porous conductive substrate using an adsorptive force of the porous conductive substrate and a controlled ambient pressure. This method starts with mixing sulfur and the dried porous conductive substrate and placing the mixture at a sealed container. Placing the sulfur and the dried porous conductive substrate in a mixed state is for uniformly filling the pores with sulfur, and is commonly performed by mechanical mixing using a pulverizing machine. Then, the mixture preferably is heated at a temperature within the range of from about 50 to 300° C. to melt sulfur in the mixture, followed by filling the pores with the molten sulfur. Subsequently, the pressure of the sealed container preferably is reduced to be within the range of from about $10^{-6}$ to 760 Torr. The molten sulfur therefore continuously fills the pores while the gas present in the pores and the sealed container is removed. Although the pores are sufficiently filled with the molten sulfur by these steps, the molten sulfur may be forcibly injected into the pores while increasing the pressure of the sealed container to be within the range of from about 760 to 7,000 Torr, to further increase the amount of sulfur filled.

In such a manner, the manufacture of the porous conductive material filled with sulfur can be completed. In order to further increase the amount of sulfur filled, the pressure reducing and increasing procedures may be repeated 2 to 10 times.

For convenient explanation, it has been described that only the pores of the porous conductive substrate are filled with sulfur. However, it is believed that not only are the pores of the conductive substrate filled with sulfur, but also the surface of the conductive substrate may be coated with sulfur, depending on the porosity of the porous conductive substrate and the amount of sulfur contained in the porous conductive substrate.

Figure 10:
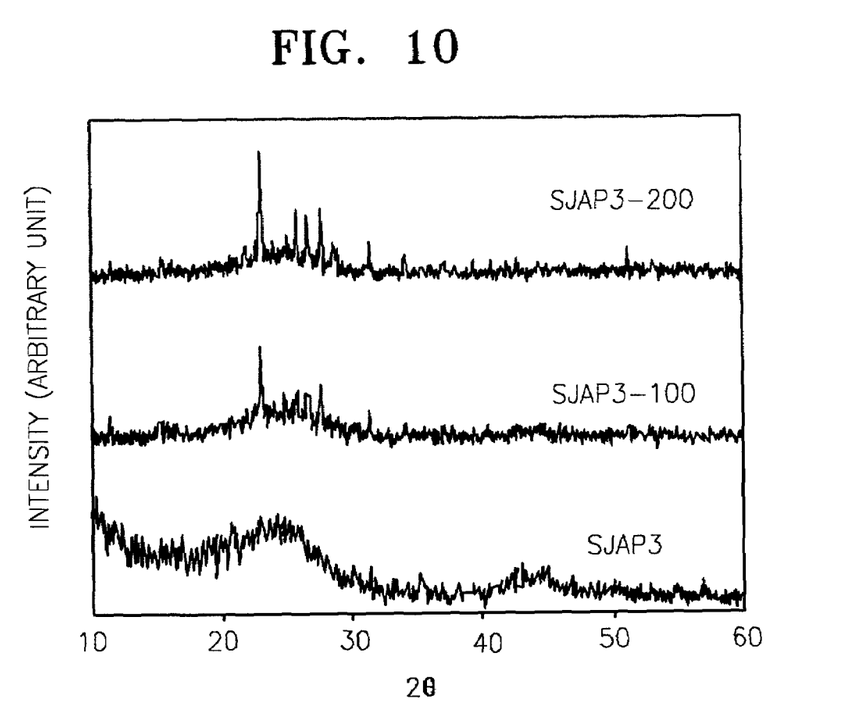
FIG. 10 shows a change in X-ray diffraction pattern depending on the amount of sulfur contained in carbon powder having specific surface area of 800 $m^2/g$.
Figure 11:
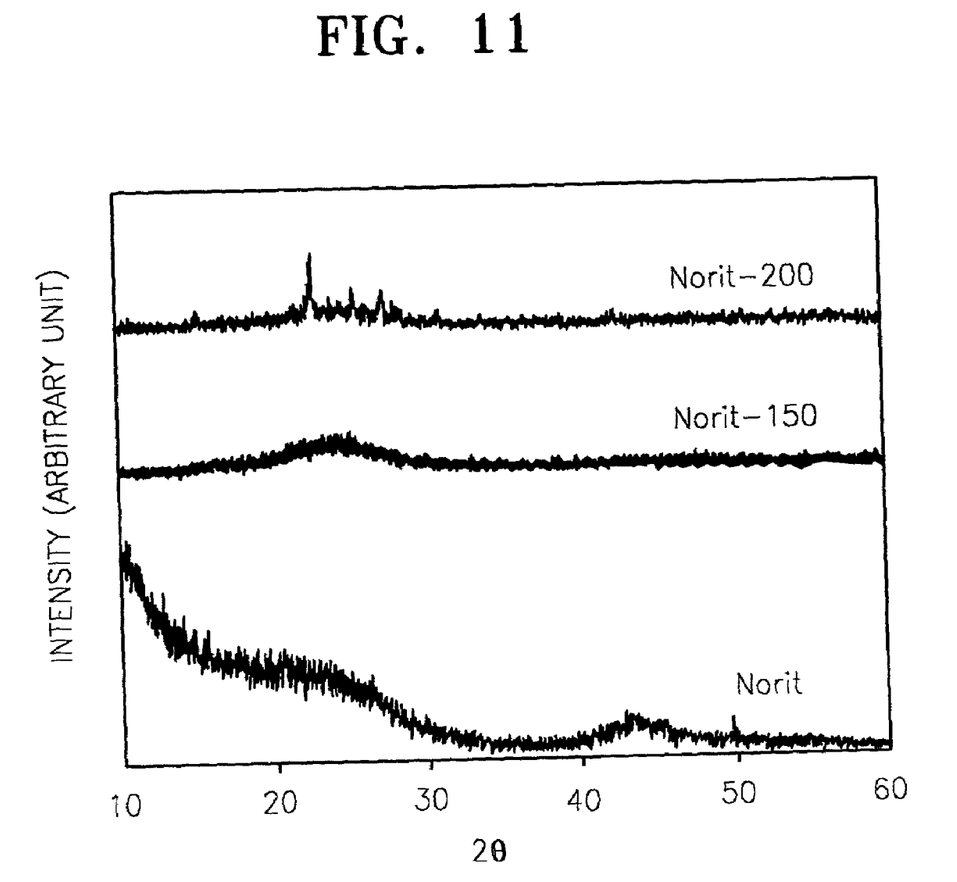
FIG. 11 shows a change in X-ray diffraction pattern depending on the amount of sulfur contained in carbon powder having specific surface area of 2,000 $m^2/g$.

FIGS. 10 and 11 show a change in X-ray diffraction patterns depending on the amount of sulfur contained in carbon powder having specific surface areas of 800 $m^2/g$ and 2,000 $m^2/g$, respectively. Referring to FIGS. 10 and 11, as the amount of sulfur contained in the porous conductive material increases, the porous conductive material has a more obvious sulfur peak, suggesting that the surface of the conductive material also is coated with sulfur.

Referring again to FIG. 10, an example using carbon powder SJAP3 in which no sulfur is contained therein, that is, the sulfur content is 0%, and having a specific surface area of 800 $m^2/g$ as a porous conductive substrate, no sulfur peak is observed, but a peak which is presumably due to presence of an impurity is observed at an angle 2θ of approximately 27°. For SJAP 3-100 in which the sulfur content is 100% based on the weight of the carbon powder, weak impurity peaks are observed and sulfur peaks are generally observed evenly throughout the region of 2θ. This tendency continues for SJAP3-200 in which the sulfur content is 200%.

FIG. 11 shows examples using carbon powder having a specific surface area of 2,000 $m^2/g$ as a porous conductive substrate. Norit, Norit-150 and Norit-200 denote examples in which the content of sulfur contained in the conductive material by weight are 0%, 150% and 200%, respectively.

FIG. 11 reveals that sulfur is not coated on the surface of the conductive material until the sulfur content reaches 200%.

Comparing the results shown in FIGS. 10 and 11, the sulfur coated on the surface of the porous conductive material begins to be observed when the content thereof reaches at least 100% in the example where the specific surface area of carbon powder is 800 $m^2/g$. However, in the example where the specific surface area of carbon powder is 2,000 $m^2/g$, no sulfur peak is observed even when the sulfur content is 150% and sulfur peaks begin to be observed when the sulfur content reaches 200%. These results suggest that when sulfur is present in the porous conductive material in an amount of less than a pore-filling amount, it mainly exists in a state in which it fills the pores. If sulfur is present in the porous conductive material in an amount of greater than or equal to a pore-filling amount, it exists in a state in which it is coated on the surface of the porous conductive material as well as in the state in which it fills the pores of the porous conductive material. Hence, as the porosity of the conductive material increases, the pore-filling amount of sulfur increases.

Various experiments carried out by the present inventors have confirmed that the same effect may be achieved both in the case of using a porous conductive material having a surface coated with sulfur and in the case of using a porous conductive material having pores filled with sulfur. In other words, substantially the same effect can be presumably achieved in both cases since stacking of the porous conductive material having a surface coated with sulfur leads to a similar shape as the porous conductive material having pores filled with sulfur. In particular, if a particle size of the conductive material is small, coating the surface of the conductive material with sulfur is more advantageously used than filling the pores with sulfur. Using the guidelines provided herein, those skilled in the art are capable of determining when it is more advantageous to coat the material with sulfur, fill the material pores with sulfur, or both.

In such a manner, preparation of the porous conductive material coated with and/or filled with sulfur, featuring the methods for manufacturing a cathode electrode and a secondary battery according to the present invention, may be completed. Manufacturing the cathode electrode and the secondary battery using the prepared porous conductive material may be performed by general methods know to those skilled in the art.

For example, from about 70 to 98% by weight of the sulfur filled and/or coated porous conductive material, and from about 2 to 30% by weight of a binder are homogenously mixed in about 40 to 200% by weight of a solvent based on total weight of the solids to produce a cathode active material slurry. A current collector then may be coated with the cathode active material slurry to a thickness of from about 5 to 500 µm and dried, thereby forming a cathode electrode having an about 2 to 200 µm thick active material layer.

In preparation of the cathode active material slurry, if the particle size of the porous conductive material filled with sulfur is within the range of from about 10 nm to 20 µm, the porous conductive material is used as it is. However, if the particle size of the porous conductive material filled with sulfur is greater than about 20 µm, the porous conductive material preferably is used after the particle size is adjusted by pulverizing the same by milling.

Polyethylene oxide, polyvinylidene fluoride, a copolymer of vinylidene fluoride and hexafluoropropylene, or a mixture of polyvinylidene fluoride and styrene-butadiene rubber can preferably be use as binders for the cathode active material slurry according to the present invention. NMP, THF, acetonitrile, isopropylalcohol or acetone can preferably be used as solvents according to the kind of binder used. However, it is preferable not to use a solvent in which sulfur is highly soluble.

The methods for manufacturing a cathode electrode and a secondary battery according to the present invention will now be described in more detail with reference to examples below. These embodiments are provided only for illustrative purposes and can be modified by one skilled in the art for specific purposes. Thus, the present invention is not limited to the particular embodiments.

EXAMPLE 1

Preparation of Sulfur Filled Porous Conductive Material

Powdered, coal-based active carbon having a specific surface area of 800 $m^2/g$ (see SEM photograph shown in FIG. 3) was vacuum dried at 180° C. for 22 hours. During this process, water was removed, reducing the weight by 2.6%. Dried active carbon (8.05 g) and 8.03 g of a sulfur monomer were loaded into separate containers. These containers were placed in a sealed container and allowed to stand at 180° C. under atmospheric pressure for 20 hours, thereby preparing a porous conductive material filled with 15.4% by weight of sulfur relative to the weight of the active carbon.

EXAMPLE 2

Preparation of Sulfur Filled Porous Conductive Material

Figure 3:
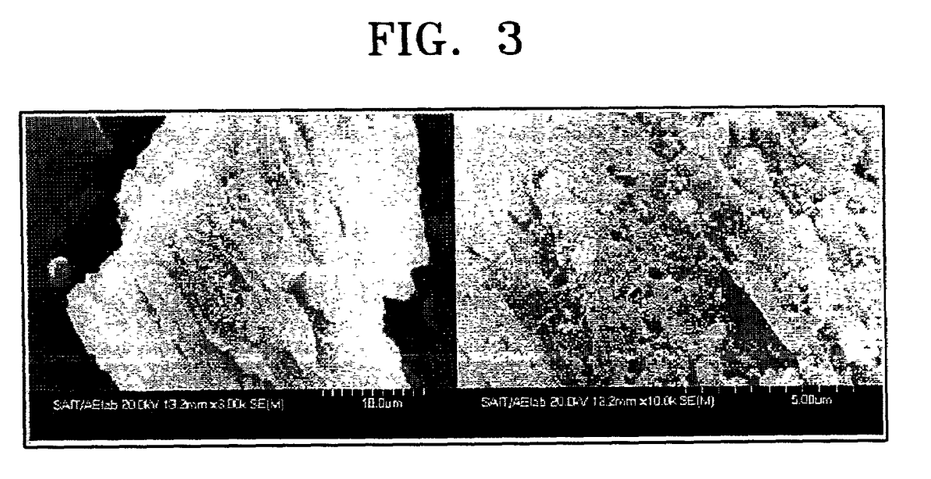
FIG. 3 is a scanning electron microscopy (SEM) photograph of a coal-based active carbon used in Examples.
Figure 4:
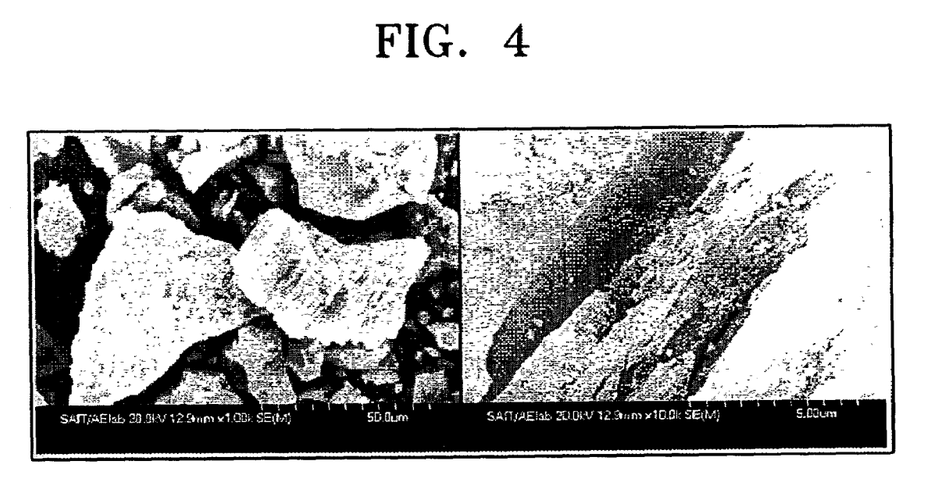
FIG. 4 is an SEM photograph of a coal-based active carbon filled with sulfur prepared in Example 2.

Powdered, coal-based active carbon having a specific surface area of 800 $m^2/g$ (see SEM photograph shown in FIG. 3) was vacuum dried at 180° C. for 22 hours. During this process, water was removed, reducing the weight by 2.6%. Dried active carbon (2.03 g) and 2.06 g of a sulfur monomer were mixed and loaded into a container. This container was placed in a sealed container and allowed to stand at 180° C. under atmospheric pressure for 20 hours, thereby obtaining a porous conductive material filled with 66.5% by weight of sulfur relative to the weight of the active carbon. An SEM photograph of the obtained sulfur filled porous conductive material is shown in FIG. 4. When compared to FIG. 3, FIG. 4 shows that pores of the active carbon are filled with sulfur.

EXAMPLE 3

Manufacture of Cathode Electrode

Powdered, coal-based active carbon having a specific surface area of 800 $m^2/g$ (see SEM photograph shown in FIG. 3) was vacuum dried at 150° C. for 72 hours. During this process, water was removed, reducing the weight by 2.13%. Dried active carbon (16.03 g) and 20.04 g of a sulfur monomer were mixed to be loaded into a container, followed by sealing. While the temperature was maintained at 150° C., the container was alternately allowed to stand under atmospheric pressure and reduced pressure of 150 Torr for each 24 hours, thereby obtaining a porous conductive material filled with 118.5% by weight of sulfur relative to the weight of the active carbon.

The porous conductive material filled with sulfur (8.03 g), 340.24 g of zirconia balls and 32.11 g of acetonitrile were placed in a 250 ml-HDPE bottle, followed by ball milling at a speed of 240 rpm for 24 hours. A 6% solution prepared by dissolving a binder polyethylene oxide having a weight average molecular weight of 600,000 in acetonitrile was loaded into the bottle so that the mixture ratio of the sulfur filled porous conductive material to binder was 91.5 (49.7/41.8) to 8.5, which then was followed by mixing at a speed of 50 rpm for 2 hours, thereby obtaining a cathode active material slurry.

The obtained cathode active material slurry was coated on an aluminum (Al) foil coated with a 15 μm thick carbon primer layer, to a thickness of 180 μm using a doctor blade, and dried at a temperature of approximately 80° C. for 24 hours. The resultant product was rolled and cut into a predetermined dimension, thereby fabricating a cathode electrode.

Figure 5:
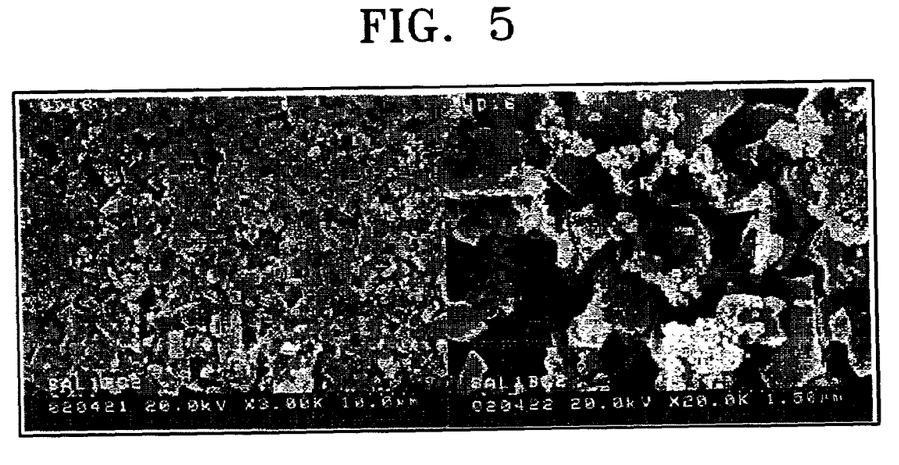
FIG. 5 is an SEM photograph showing the surface of a cathode electrode prepared in Example 3.
Figure 6:
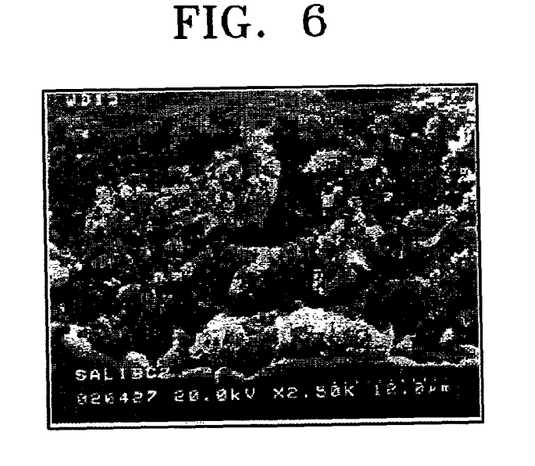
FIG. 6 is an SEM photograph showing the cross-section of a cathode electrode prepared in Example 3.

FIGS. 5 and 6 are SEM photographs showing the surface and cross-section of the cathode electrode prepared in Example 3, respectively. In detail, FIG. 5 shows the surface of the cathode electrode, in which particles of amorphous, porous conductive material filled with sulfur, having an average diameter of approximately 1 μm, are partly surrounded by a binder. FIG. 6 shows the cross-section of the cathode electrode, in which an active material layer having a thickness of approximately 20 μm is formed of particles of the porous conductive material having an average diameter of approximately 1 μm.

EXAMPLE 4

Manufacture of Lithium Secondary Battery Cell

A lithium secondary battery cell having an electrode area of 6.3 $cm^2$ was assembled using the cathode electrode prepared in Example 3 with a cathode active material loading level of about 1 $mAh/cm^2$ (assuming that 1 g of sulfur has a theoretical capacity of 838 mAh/g). Separately from the above, a metallic lithium plate was cut into a predetermined dimension to fabricate a lithium metal anode electrode. A 25 μm thick separator made of polyethylene was disposed between the fabricated cathode and anode electrodes, and assembled into a pouch-type lithium battery cell. An organic electrolytic solution was injected into the pouch and sealed, thereby completing a lithium secondary battery. Approximately 90 mg of an electrolytic solution in which 1.0 M $LiSO_3CF_3$ was dissolved in a cosolvent prepared by mixing dioxolane (DOX), diglyme (DGM), dimethoxyethane (DME) and sulfolane (SUL) in a volume ratio of 5:2:2:1, was used as the organic electrolytic solution.

The lithium battery cell completed according to the above-described manner was allowed to stand for 4 hours, and a cycling test was carried out at 0.5 C, preceded by discharging and charging with 0.25C in the voltage range of 2.8-1.5 V.

During charging, a cut-off voltage condition of 150% of the rated capacity was additionally set. The results of charging and discharging are shown in FIG. 7.

Figure 7:
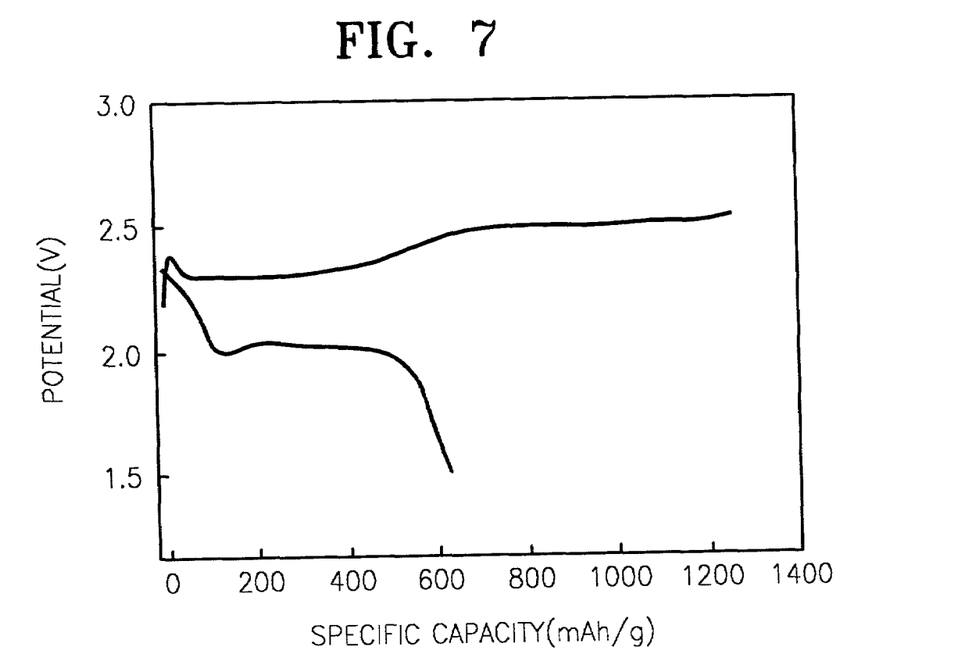
FIG. 7 is a graph showing charging and discharging curves of a lithium battery prepared using the cathode electrode manufactured in Example 3.

Referring to FIG. 7, it was confirmed that during discharging, the potential of the battery did not drop below 2 V even when the specific capacity exceeded 500 mAh/g.

EXAMPLE 5

Manufacture of Lithium Battery Cell

Powdered, active carbon having a specific surface area of 2000 m²/g was vacuum dried at 150° C. for 72 hours. About 11.6 g of vacuum-dried active carbon and 20.66 g of a sulfur monomer were mixed to be loaded into a container, followed by sealing. The container was allowed to stand at 150° C. under 760 Torr for 24 hours. Subsequently, while the temperature was maintained at 150° C., the container was alternately allowed to stand under atmospheric pressure and reduced pressure of 150 Torr for 10 cycles, thereby obtaining a porous conductive material filled with 186% by weight of sulfur relative to the weight of the active carbon.

The porous conductive material filled with sulfur (10.76 g), 345 g of zirconia balls and 16 g of acetonitrile were placed in a 250 ml-HDPE bottle, followed by ball milling at a speed of 200 rpm for 24 hours. Then, a 4% solution prepared by dissolving a binder comprised of polyethylene oxide having a weight average molecular weight of 4,000,000 in acetonitrile was loaded into the bottle so that the mixture ratio of the sulfur filled porous conductive material to binder was 95 to 5, followed by mixing at a speed of 50 rpm for 2 hours, thereby obtaining a cathode active material slurry.

Figure 8:
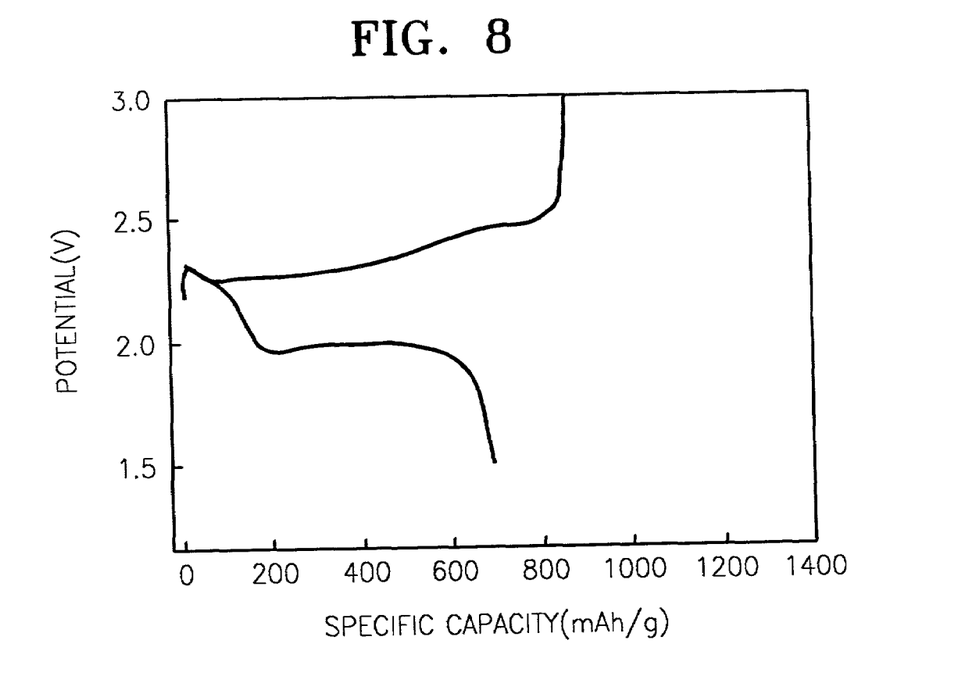
FIG. 8 is a graph showing charging and discharging curves of a lithium battery prepared using a cathode electrode manufactured in Example 5.

The obtained cathode active material slurry was coated on an Al foil coated with a 15 μm thick carbon primer layer, to a thickness of 200 μm using a doctor blade, and dried at a temperature of approximately 80° C. for 24 hours. The resultant product was rolled and cut into a predetermined dimension, thereby fabricating a cathode electrode. A lithium secondary battery cell having an electrode area of 6.3 Cm² was assembled using the cathode electrode prepared by the same method described in Example 4 having a cathode active material loading level of about 1 mAh/cm² (assuming that 1 g of sulfur has a theoretical capacity of 838 mAh/g). Charging and discharging tests were carried out on the completed lithium secondary battery cell under the same conditions and by the same method as described above. The results of charging and discharging are shown in FIG. 8. Referring to FIG. 8, it was confirmed that during discharging, the potential of the battery did not drop below 2 V even when the specific capacity exceeded 500 mAh/g.

COMPARATIVE EXAMPLE

Manufacture of Lithium Secondary Battery Cell using Sulfur as Cathode Active Material A sulfur monomer (7.0 g) was placed in a 250 ml-HDPE bottle and milled in an acetonitrile solution using 340 g of zirconia balls at a speed of 200 rpm for 24 hours, thereby obtaining sulfur particles. The sulfur particles were mixed with a slurry solution prepared by dissolving Super-P carbon black (MMM Carbon, S.A., Brussels, Belgium) as a carbon conductive material and polyethylene oxide (PEO) having a weight average molecular weight of 600,000 in an acetonitrile/NMP cosolvent in a weight ratio of 1.67:1, thereby obtaining a cathode active material slurry containing 55.54% by weight of sulfur.

The obtained cathode active material slurry was coated on an Al foil coated with a 15 μm thick carbon primer layer, to a thickness of 220 μm using a doctor blade, and dried at a temperature of approximately 80° C. for 24 hours. The resultant product was rolled and cut into a predetermined dimension, thereby fabricating a cathode electrode.

A lithium secondary battery cell having an electrode area of 6.3 cm² was assembled using the cathode electrode prepared by the same method as described in Example 4 with a cathode active material loading level of about 1 mAh/cm² (assuming that 1 g of sulfur has a theoretical capacity of 838 mAh/g).

Charging and discharging tests were carried out on the completed lithium secondary battery cell under the same conditions and by the same method as described above. The results of charging and discharging are shown in FIG. 9.

Figure 9:
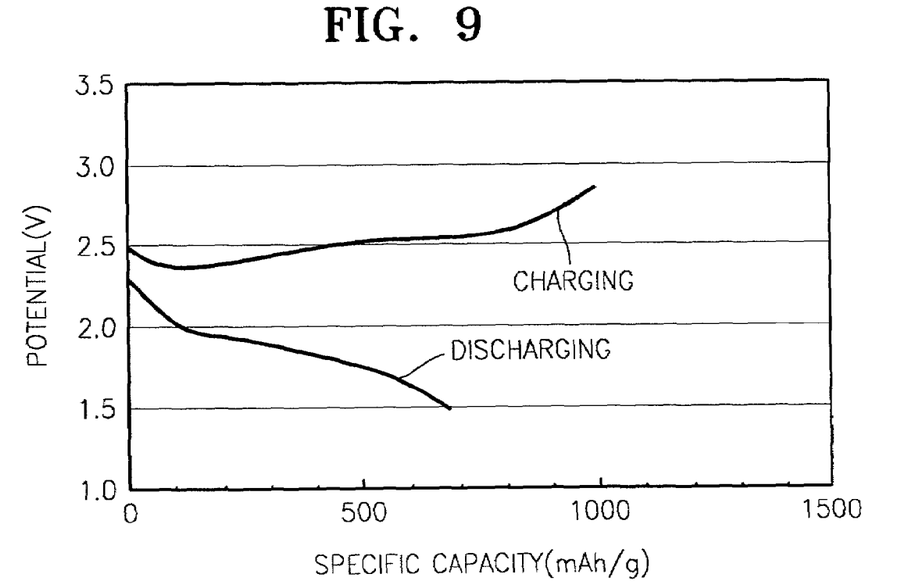
FIG. 9 is a graph showing charging and discharging curves of a lithium battery prepared using a cathode electrode manufactured in Comparative Example.

Referring to FIG. 9, it was confirmed that during discharging, the potential of the battery did drop below 2 V or less initially when the specific capacity exceeded about 100 mAh/g.

By comparing the results shown in FIGS. 7 through 9, it can be seen that the lithium secondary battery employing the cathode electrode prepared using the sulfur filled porous conductive material according to the present invention exhibits stable charging and discharging characteristics.

In a lithium secondary battery employing a cathode electrode having a porous conductive material whose pores are filled with sulfur and/or whose surface is coated with sulfur as described above, the structure of the cathode active material layer may be maintained even at phase transition of sulfur during charging and discharging. Thus, the cathode electrode according to the present invention, which is structurally stable during charging and discharging, is distinguishable from a conventional cathode electrode using sulfur as a cathode active material in which a cathode active material and a conductive material occupy separate spaces in the cathode electrode.

While the invention has been described with reference to particularly preferred embodiments and examples, those skilled in the art will appreciate that various modifications may be made to the invention without departing from the spirit and scope thereof.

What is claimed is:

1. A cathode electrode having a cathode active material layer stacked on a current collector, wherein the cathode active material layer comprises a porous conductive material that includes metal powder and is selected from the group consisting of one or more of: (i) a porous conductive material whose pores are filled with sulfur and/or a sulfur-containing organic compound, wherein the pores have an average diameter of about 0.05 nm to about 1 μm; and (ii) a porous conductive material whose surface is coated with and whose pores are filled with sulfur and/or a sulfur-containing organic compound, wherein the pores have an average diameter of about 0.05 nm to about 1 μm.

2. The cathode electrode according to claim 1, wherein the porous conductive material is electrochemically connected to the current collector and another porous conductive material.

3. The cathode electrode according to claim 1, wherein the porous conductive material further includes porous carbon powder.

4. The cathode electrode according to claim 1, wherein the pores have an average diameter of about 0.5 nm to about 1 μm.

5. The cathode electrode according to claim 1, wherein the porous conductive material is bound to the current collector and another porous conductive material by at least one binder selected from the group consisting of polyethylene oxide, polyvinylidene fluoride, a copolymer of vinylidene fluoride and hexafluoropropylene, and a mixture of polyvinylidene fluoride, styrene-butadiene rubber, and mixtures thereof.

6. The cathode electrode according to claim 1, wherein the amount of the porous conductive material present in the cathode active material layer is from about 70 to about 98% by weight based on the weight of the cathode active material layer.

7. The cathode electrode according to claim 1, wherein the average particle size of the porous conductive material is within the range of from about 10 nm to about 20 μm.

8. The cathode electrode according to claim 7, wherein the average particle size of the porous conductive material is within the range of from about 0.5 μm to about 20 μm.

9. The cathode electrode according to claim 1, wherein the porous conductive material has a specific surface area of greater than or equal to 300 $m^2/g$.

10. A secondary battery comprising a cathode electrode according to claim 1.

11. A porous conductive material for use in a cathode active material for a secondary battery, wherein:
    the porous conductive material includes metal powder, and
      the pores of the porous conductive material have an average diameter of about 0.05 nm to about 1 μm and are filled with sulfur and/or a sulfur-containing organic compound; or
      the surface of the porous conductive material is coated with sulfur and/or a sulfur-containing organic compound and the pores of the porous conductive material have an average diameter of about 0.05 nm to about 1 μm and are filled with sulfur and/or a sulfur-containing organic compound.

12. The porous conductive material according to claim 11, wherein the porous conductive material further includes porous carbon powder.

13. The porous conductive material according to claim 12, wherein the average particle size of the porous conductive material is within the range of from about 10 nm to about 20 μm.

14. The porous conductive material according to claim 13, wherein the average particle size of the porous conductive material is within the range of from about 0.5 μm to about 20 μm.

15. The porous conductive material according to claim 11, wherein the pores have an average diameter of about 0.5 nm to about 1 μm.

16. The cathode electrode according to claim 11, wherein the porous conductive material has a specific surface area of greater than or equal to 300 $m^2/g$.

* * * * *